US009288126B2

(12) United States Patent
Willink et al.

(10) Patent No.: US 9,288,126 B2
(45) Date of Patent: Mar. 15, 2016

(54) CLUSTERHEAD SELECTION IN A COMMUNICATION NETWORK

(75) Inventors: Patricia Janet Willink, Ottawa (CA); Kareem Emile Baddour, Ottawa (CA); Oktay Ureten, Ottawa (CA)

(73) Assignee: Her Majesty The Queen in Right of Canada As Represented By The Minister of Industry, Through The Communications Research Centre Canada (CA)

(*) Notice: Subject to any disclaimer, the term of this patent is extended or adjusted under 35 U.S.C. 154(b) by 464 days.

(21) Appl. No.: 12/845,360

(22) Filed: Jul. 28, 2010

(65) Prior Publication Data
US 2012/0030342 A1 Feb. 2, 2012

(51) Int. Cl.
G06F 15/16 (2006.01)
H04L 12/26 (2006.01)
H04L 29/08 (2006.01)

(52) U.S. Cl.
CPC ........ H04L 43/0805 (2013.01); H04L 67/1095 (2013.01)

(58) Field of Classification Search
CPC .............................. H04W 84/18; H04L 12/24
USPC ........................................................ 709/224
See application file for complete search history.

(56) References Cited

U.S. PATENT DOCUMENTS

| 6,829,222 | B2* | 12/2004 | Amis et al. ............... 370/238 |
| 2002/0018448 | A1* | 2/2002 | Amis et al. ............... 370/255 |
| 2002/0169846 | A1 | 11/2002 | Chen et al. |
| 2004/0018839 | A1* | 1/2004 | Andric et al. ............ 455/433 |
| 2007/0203872 | A1 | 8/2007 | Flinn et al. |
| 2008/0309480 | A1* | 12/2008 | Youn et al. ............... 340/539.3 |
| 2010/0042716 | A1* | 2/2010 | Farajidana et al. ....... 709/224 |

OTHER PUBLICATIONS

Ngo et al. MEPA: A New Protocol for Energy-Efficient, Distributed Clustering in Wireless Sensor Networks. Oct. 2007. IEEE.*
Shea et al. Mobility-Based Clustering in VANETs using Affinity Propagation. Nov. 2009. Crown.*
Frey et al. Clustering by Passing Messages Between Data Points. Feb. 2007. Science.*
Ngo et al. A Message-Passing Approach to Min-Cost Distributed Clustering in Wireless Sensor Networks. Oct. 2008. IEEE.*

(Continued)

*Primary Examiner* — Bryan Lee
(74) *Attorney, Agent, or Firm* — Moritt Hock & Hamroff LLP; Steven S. Rubin, Esq.

(57) ABSTRACT

Technologies are generally described for clusterhead selection in a communication network. In an example, a first node may be configured to send a first responsibility and availability. In some examples, the first responsibility indicates a responsibility attributed to the second node to be the clusterhead for the first node. In some examples, the first availability indicates an availability of the first node to be the clusterhead for the second node. In some examples, the first node is effective to receive a second responsibility and availability; the second responsibility indicating a responsibility attributed to the first node to be the clusterhead for a second node; the second availability indicating an availability of the second node to be the clusterhead for the first node. In some examples, the first node is effective to determine the clusterhead based on the first and second responsibility and the first and second availability.

18 Claims, 4 Drawing Sheets

(56) References Cited

OTHER PUBLICATIONS

Baddour, K.E., et al. "A Distributed Message-passing Approach for Clustering Cognitive Radio Networks," Parts of this paper have been presented at the 2nd Workshop on Cognitive Networks and Communications (COGCOM2009), Published Online: Apr. 28, 2010, pp. 1-15.
Doss, R. and Li, G., "Exploiting Affinity Propagation for Energy-Efficient Information Discovery in Sensor Networks," 2008 IEEE, pp. 1-6.
Elgammal, M. and Eltoweissy, M., "Location-Aware Affinity Propagation Clustering in Wireless Sensor Networks," IEEE International Conference on Wireless and Mobile Computing, Networking and Communications, 2009. WIMOB 2009, pp. 471-475.
Feng, C. et al., "Orientation-Aware Indoor Localization using Affinity Propagation and Compressive Sensing," Dec. 13, 2009, pp. 261-264.
Shea, C. et al., "Mobility-based Clustering in VANETs using Affinity Propagation," GLOBECOM'09, Proceedings of the 28th IEEE conference on Global telecommunication, 2009, pp. 1-6.
Üreten, O., et al., "Distributed Selection of Sensing Nodes in Cognitive Radio Networks," 2010 7th International Symposium on Wireless Communication Systems (ISWCS), Sep. 19-22, 2010, pp. 1056-1060.
http://www.comm.utoronto.ca/~valaee/ accessed on May 3, 2012, pp. 1-3.
Yu et al. (2005) "A Survey of Clustering Schemes for Mobile Ad Hoc Networks", IEEE Communications Surveys & Tutorials; 7(1): 32-47.
Wang et al. (2007) "Adaptive Affinity Propogation Clustering", Acta Automatica Sinica; 33(12): 1242-1246.
Sun et al. (2007) "Cluster-Based Cooperative Spectrum Sensing in Cognitive Radio Systems", IEEE Communications Society; 2511-2515.
Chen et al. "Clustering Algorithms for Ad Hoc Wireless Networks"; p. 1-16.
Frey et al. (2007) "Clustering by Passing Messages Between Data Points", Science; 315 p. 972-976.
Mezard (2007) "Where are the Exemplars?", Science; 315 p. 949-951.
Frey et al. (2007) Supporting Online Material for "Clustering by Passing Messages Between Data Points", Science; p. 1-15.
Malady et al. (2008) "Clustering Methods for Distributed Spectrum Sensing in Cognitive Radio Systems", IEEE; p. 1-5.
Chen et al. (2007) "Topology Management in CogMesh: A Cluster-based Cognitive Radio Mesh Network", IEEE; p. 6516-6521.
Mishra et al. "Cooperative Sensing among Cognitive Radios", School of Electrical Engineering and Computer Science.
Chvatal (1979) "A Greedy Heuristic for the Set-Covering Problem", Mathematics of Operations Research; 4(3): 233-235.
Viswanathan et al. (1997) "Distributed Detection With Mutiple Sensors: Part I—Fundamentals", Proceedings of the IEEE; 85(1): 54-63.
Baddour et al. (2009) "Efficient Clustering of Cognitive Radio Networks Using Affinity Propagation", Crown.
Wang et al. (2006) "Efficient Distributed Low-Cost Backbone Formation for Wireless Networks", IEEE Transactions on Parallel and Distributed Systems; 17(7): 681-693.
Urkowitz (1967) "Energy Detection of Unknown Deterministic Signals", Proceedings of the IEEE; 55(4): 523-531.
Forkel et al. "Generation of Two-Dimensional Correlated Shadowing for Mobile Radio Network Simulation".
Ghasemi et al. (2007) "Opportunistic Spectrum Access in Fading Channels Through Collaborative Sensing", Journal of Communications; 2(2): 71-82.
Zhang et al. (2009) "Optimal Cooperative Sensor Set Selecting Algorithm under Sensing Performance Constraints", 253-257.
Franceschetti et al. (2007) "Random Networks for Communication", Cambridge University Press.
Sun et al. (2008) "Selection of Sensing Nodes in Cognitive Radion System based on Correlation of Sensing Information" IEEE; p. 1-6.
Selen et al. (2008) "Sensor Selection for Cooperative Spectrum Sensing", IEEE; p. 1-11.
Zhang et al. (2010) "Sensor Set Selection under Correlated Log-normal Shadowing for Cognitive Radio", IEEE; p. 75-78.
Baker et al. (1981) "The Architectural Organization of a Mobile Radio Network via a Distributed Algorithm", IEEE; p. 1694-1701.
Fabbri et al. (2009) "The Impact of Correlated Channel Fluctuations on the Connectivity of Wireless Ad-Hoc Networks", IEEE; p. 1-5.
Bao et al. (2003) "Topology Management in Ad Hoc Networks", MobiHoc '03; p. 129-140.
Cordeiro et al. (2005) "A Cognitive PHY/MAC Proposal for IEEE", IEEE; Slide 1-152.
Akyildiz, I. F., et al., "Next generation/dynamic spectrum access/cognitive radio wireless networks: A survey," Computer Networks, vol. 50, Issue 13, pp. 2127-2159, Sep. 15, 2006.
Dueck, D., "Affinity Propagation: Clustering Data by Passing Messages," Ph.D. dissertation, Department of Electrical & Computer Engineering, University of Toronto, 2009, pp. 1-154.
Gerla, M., and Tsai, J. T., "Multicluster, mobile, multimedia radio network," Wireless Networks, 1995, vol. 1, pp. 255-265, Issue 3.
Zhao, J., et al., "Spectrum sharing through distributed coordination in dynamic spectrum access networks," Wireless Communications and Mobile Computing, Nov. 2007, pp. 1061-1075, vol. 7, Issue 9.

\* cited by examiner

300 A computer program product.
302 A signal bearing medium.

304

At least one of

One or more instructions for a selecting a clusterhead in a network comprising a plurality of nodes, or One or more instructions for sending from a first node a first responsibility and a first availability to a second node, wherein the first responsibility indicates a responsibility attributed to the second node to be the clusterhead for the first node, wherein the first availability indicates an availability of the first node to be the clusterhead for the second node; or One or more instructions for receiving from a second node a second responsibility and a second availability at the first node, wherein the second responsibility indicates a responsibility attributed to the first node to be the clusterhead for the second node, wherein the second availability indicates an availability of the second node to be the clusterhead for the first node; or One or more instructions for determining, by the first node, the clusterhead based on the first responsibility, second responsibility, first availability and second availability.

| 306 A computer-readable medium | 308 A recordable medium | 310 A communications medium |

Fig. 3

CLUSTERHEAD SELECTION IN A COMMUNICATION NETWORK

BACKGROUND

Unless otherwise indicated herein, the materials described in this section are not prior art to the claims in this application and are not admitted to be prior art by inclusion in this section.

A network may include nodes in communication with each other though communication links. In a wireless network, the links could communicate data using a frequency or range of frequencies. A topology of some wireless networks may change over time so that nodes may communicate using different frequencies or frequency ranges.

SUMMARY

In an example, a method for selecting a clusterhead in a network including at least two nodes is described. In an example the method includes sending from a first node a first responsibility and a first availability to a second node. In some examples, the first responsibility indicates a responsibility attributed to the second node to be the clusterhead for the first node, in some examples, the first availability indicates an availability of the first node to be the clusterhead for the second node. In some examples, the method includes receiving from a second node a second responsibility and a second availability at the first node. In some examples, the second responsibility indicates a responsibility attributed to the first node to be the clusterhead for the second node. In some examples, the second availability indicates an availability of the second node to be the clusterhead for the first node. In some examples, the method includes determining, by the first node, the clusterhead based on the first responsibility, second responsibility, first availability and second availability.

In another example, a first node effective to select a clusterhead in a network including at least two nodes is described. In some examples, the first node includes a memory and a processor in communication with the memory. In some examples, the processor may be configured to send a first responsibility and a first availability to a second node. In some examples, the first responsibility indicates a responsibility attributed to the second node to be the clusterhead for the first node. In some examples, the first availability indicates an availability of the first node to be the clusterhead for the second node. In some examples, the processor may be configured to receive from a second node a second responsibility and a second availability. In some examples, the second responsibility indicates a responsibility attributed to the first node to be the clusterhead for the second node. In some examples, the second availability indicates an availability of the second node to be the clusterhead for the first node. In some examples, the processor may be configured to determine the clusterhead based on the first responsibility, second responsibility, first availability and second availability. In some examples, the processor may be configured to store an indication of the clusterhead in the memory.

In another example, a system effective to select a clusterhead in a network including at least two nodes is described. In some examples, the system includes a first node including a first memory and a first processor. In some examples, the system includes a second node in communication with the first node, the second node including a second memory and a second processor. In some examples, the first processor may be configured to send a first responsibility and a first availability to the second node. In some examples, the first responsibility indicates a responsibility attributed to the second node to be the clusterhead for the first node. In some examples, the first availability indicates an availability of the first node to be the clusterhead for the second node. In some examples, the second processor may be configured to receive the first responsibility and the first availability. In some examples, the second processor may be configured to send a second responsibility and a second availability to the first node. In some examples, the second responsibility indicates a responsibility attributed to the first node to be the clusterhead for the second node. In some examples, the second availability indicates an availability of the second node to be the clusterhead for the first node. In some examples, the first processor is configured to receive the second responsibility and the second availability. In some examples, the first processor may be configured to determine the clusterhead based on the first responsibility, second responsibility, first availability and second availability. In some examples, the first processor may be configured to store an indication of the clusterhead in the first memory.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 3 illustrates a computer program product for implementing clusterhead selection in a communication network.

DETAILED DESCRIPTION

Figure 1:
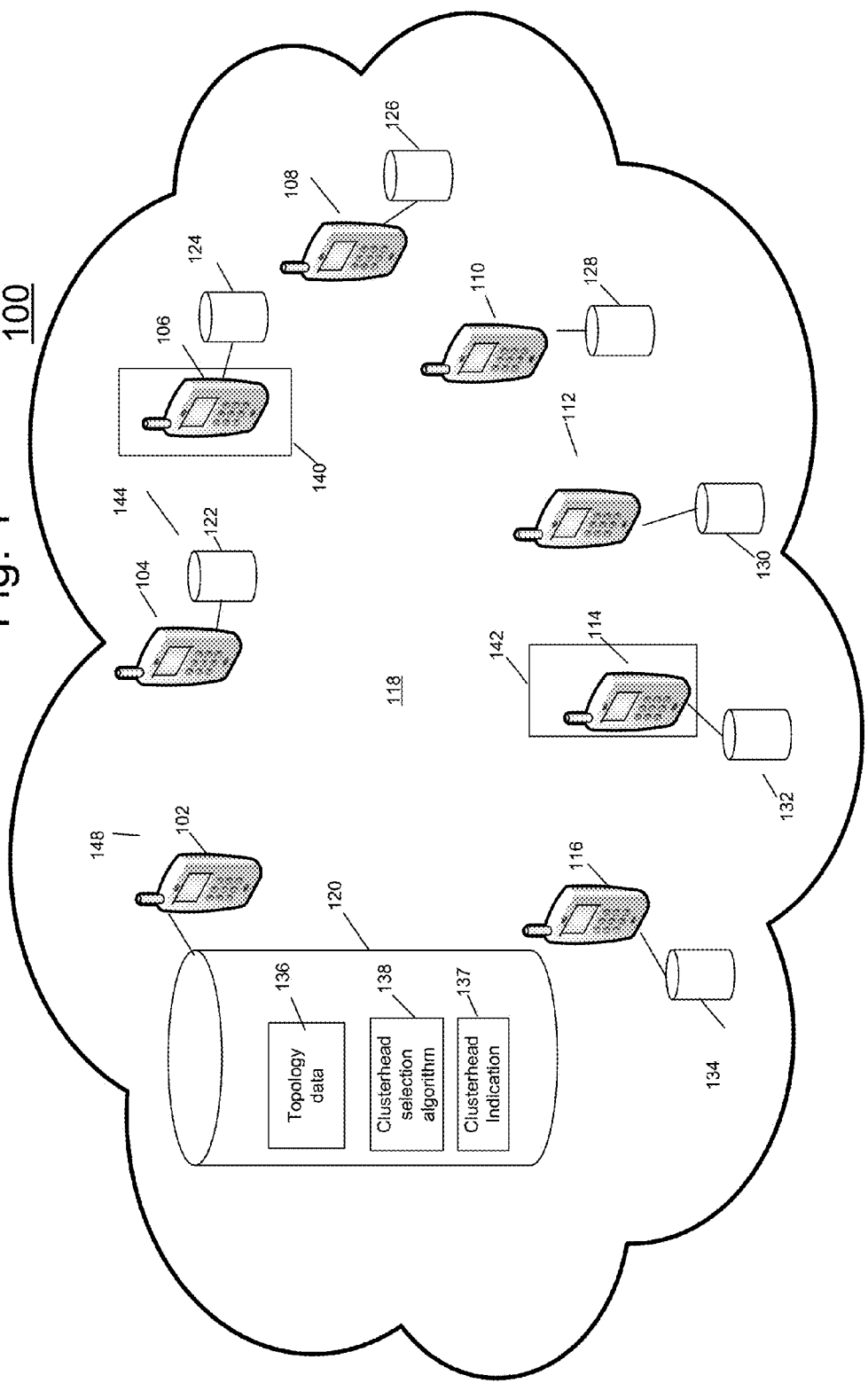
FIG. 1 illustrates some example systems that can be utilized to implement clusterhead selection in a communication network.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to clusterhead selection in a communication network.

Briefly stated, technologies are generally described for clusterhead selection in a communication network. In an example, a first node may be configured to send a first responsibility and availability. In some examples, the first responsibility indicates a responsibility attributed to the second node to be the clusterhead for the first node. In some examples, the first availability indicates an availability of the first node to be the clusterhead for the second node. In some examples, the first node is effective to receive a second responsibility and availability; the second responsibility indicating a responsibility attributed to the first node to be the clusterhead for a second node; the second availability indicating an availability of the second node to be the clusterhead for the first node. In some examples, the first node is effective to determine the clusterhead based on the first and second responsibility and the first and second availability.

FIG. 1 illustrates some example systems that can be utilized to implement clusterhead selection in a communication network in accordance with at least some embodiments described herein. In some examples, a system 100 may include nodes such as a node 102, a node 104, a node 106, a node 108, a node 110, a node 112, a node 114 and/or a node 116 all in communication over a network 118. In some examples, one or more nodes may be static transmitters generally staying in one location. In some examples, one or more nodes may be part of a mobile network where communication frequencies between nodes may change over time. Network 118 may be wired, wireless or a combination of wired and wireless.

In some examples, each node may include a processor and may be in communication with and/or include a memory. In the example shown, node 102 is in communication and/or includes a memory 120, node 104 is in communication and/or includes a memory 122, and node 106 is in communication and/or includes a memory 124. In the example shown, node 108 is in communication and/or includes a memory 126, node 110 is in communication and/or includes a memory 128, and node 112 is in communication and/or includes a memory 130. In the example shown, node 114 is in communication and/or includes a memory 132, and node 116 is in communication and/or includes a memory 134.

In the figure, some example contents of memory 120 are shown. Other memories 122, 124, 126, 128, 130, 132 and/or 134 may include some or all of the same contents as memory 120. In some examples, memory 120 may be adapted to include topology data 136, a clusterhead selection algorithm 138, and an indication 137 of a selected clusterhead. In some examples, topology data 136 may include data regarding neighbor nodes in network 118. For example, topology data 136 in a particular node may be adapted to indicate include a list of nodes N hops away from the particular node. In an example, topology data 136 may be adapted to indicate a signal strength between the particular node and neighbor nodes and/or shared communication frequencies between the particular node and neighbor nodes. In an example, topology data 136 may be adapted to indicate information reflecting a similarity between the particular node and neighbor nodes.

As discussed in more detail below, in some examples, clusterhead selection algorithm 138 may be adapted to select one or more clusterheads in network 118 along with corresponding clusters of nodes. In an example, nodes 106 and 114 are indicated as being selected clusterheads by marking 140, 142. In an example, the clusterheads may be adapted to receive and send data requests on behalf of a corresponding cluster. In an example, a clusterhead may communicate using the same frequency or frequencies as nodes in the corresponding sensor cluster. In an example, a clusterhead may represent one sensor among many sensors in a corresponding cluster. In this example, the clusterhead may enable a processor to be configured to determine whether sensors exist in network 118, whether sensors are enabled, and with which sensor the processor should communicate. In an example with 100 nodes in network 118, 10 clusterheads may be selected along with 10 corresponding clusters. In example, clusterheads and clusters may be selected so as reduce communication overhead and inter-cluster status updates in network 118.

In an example, one or more nodes in network 118 may be configured to determine topology data 136 of neighboring nodes during a discovery process. For example, one or more nodes may be configured to determine which nodes are neighbor nodes by determining which nodes are within N communication hops. In the example, each node may be configured to determine a label for each neighbor node, and a list of available communication frequencies of each neighbor node. In an example, N may equal 1.

In an example, after the topology data is determined, at least one node may be configured to iteratively send similarity information to neighbor nodes regarding similarities between nodes in network 118. As is explained in more detail below, this iterative process may help build a picture of similarities between neighbor nodes, and with neighbors of neighbor nodes. For example, clusterhead selection algorithm 138 may be adapted to use an affinity propagation algorithm to determine a similarity of nodes in network 118. In some examples, clusterhead selection algorithm 138 may be adapted to instruct a node to use data relating to similarity of nodes to select a clusterhead.

More specifically, in an example, clusterhead selection algorithm 138 may be adapted to instruct at least one node to iteratively send information regarding a responsibility r and/or and availability a of the respective node. In an example, a responsibility r(i,k) sent from node i to a candidate clusterhead node k may reflect accumulated data indicating a responsibility attributed to node k to be the clusterhead for node i taking into account other potential clusterheads for node i. In an example, an availability a(i,k) sent from a candidate clusterhead node k to a node i may reflect accumulated data indicating an availability for node k to be a clusterhead for node i. Availability a may take into account information from nodes other than i and k and which support selection of node k as a clusterhead.

In an example, clusterhead selection algorithm 138 may be adapted to compute responsibility r and availability a between at least some of the nodes in network 118. The responsibility r and availability a may be updated at each node during each iteration by using the following formula:

$$r(i, k) \leftarrow s(i, k) - \max_{k' \neq k}\{a(i, k') + s(i, k')\}$$

$$a(i, k) \leftarrow \min\left\{0, r(k, k) + \sum_{i' \notin \{i,k\}} \max\{0, r(i', k)\}\right\}$$

where s(i,k) may be a similarity between nodes i and k. Similarity s may indicate how well node k may be suited to be the clusterhead for node i due to similarities between the nodes. For example, similarity a may be based on one or more of a combination of shared communication frequencies between node i and k, a strength of a communication link between node i and k, geographic proximity, a type of information being transmitted by a node such as video, audio, email, instant messaging, correlation of node sensor observations, node velocity, priority of node information, data volume produced by a node, node resource availability, information destination, group membership, etc. For example, if the similarity is based on a strength of a communication link, if nodes i and k have a strong communication link, their similarity may be high. In this case, responsibility r may be higher than if the nodes were less similar. For example, if node 112 indicates a low similarity to node 114, and node 114 indicates a high similarity with node 116, then node 116 is more likely to be selected as a clusterhead.

In an example, the value of similarity s may be updated over time. For example, a first strength of a communication link between nodes may be determined during the discovery of the topology data and stored in topology data 136. As nodes exchange responsibility and availability information with each other, an updated strength of communication links along with an updated similarity value may be determined and used for similarity s.

In an example, clusterhead selection algorithm 138 may be adapted to initially set at least some availabilities and responsibilities to zero and then update these values iteratively using the formula above. In some examples, clusterhead selection algorithm 138 may be adapted to terminate the iterative exchanges of information among nodes after a convergence. For example, the exchanges may converge after a defined number of iterations, after changes in availability and responsibility values fall below a threshold, and/or after selected clusterheads stay constant for a set number of iterations. In an example, clusterhead selection algorithm 138 may be adapted to, after a defined number of iterations, instruct a node i to select node i as a clusterhead when $a(i,i)+r(i,i)>x$, where x may be a threshold number that may be chosen for the application. In one example, x may equal 0. Otherwise, node i may be instructed to select one of its neighbors as a clusterhead. In an example, node i may be configured to select the neighbor as a clusterhead with the highest similarity value with node i. In an example, when two or more particular nodes indicate the same availability or responsibility value with a candidate node, clusterhead selection algorithm 138 may be adapted to add a random function to determine a higher availability or responsibility value between the particular nodes and the candidate node. In an example, node i may be configured to select a neighbor node as a clusterhead based on load balancing such as by selecting a node as a clusterhead with the fewest neighbors. In examples where a particular node does not have a clusterhead as one of its neighbors, the particular node may be instructed to select itself as a clusterhead. In an example, after clusterheads are selected for network 118, each clusterhead may be configured to send a message to neighbor nodes in the corresponding cluster indicating that the node has been selected as a clusterhead.

In an example, during the iterations of exchanges of data, availability and responsibility values can be damped to avoid instability by adding a damping variable $\lambda$ as shown:

$$r_n(i,k) \leftarrow (1-\lambda)r_n(i,k) + \lambda r_{n-1}(i,k)$$

$$a_n(i,k) \leftarrow (1-\lambda)a_n(i,k) + \lambda a_{n-1}(i,k)$$

where n is the iteration number. A larger value for the variable $\lambda$ may slow down convergence while reducing oscillations. The variable $\lambda$ applies a weight to historical received availability and responsibility values. A larger value yields less weight for the historical information. In an example $\lambda$, may be 0.5.

In an example, a self-similarity value may be used by clusterhead selection algorithm 138 to affect a number of clusterheads selected in network 118. For example, the self-similarity value may indicate an availability and responsibility of a node to itself. For example, a larger self-similarity value of a particular node may make it more likely that the particular node may be selected as a clusterhead. For example, if many nodes have large self-similarity values, these nodes may be more likely to select themselves as clusterheads resulting in a large number of total clusters. In an example, a degree a of a node, which may be the number of nodes with which the node exchanges responsibility and availability messages, may be used as a basis for the self-similarity value s(i,i).

In an example, the following equation could be used for the self-similarity value s(i,i):

$$s(i, i) = \alpha_i - \max_{i \in M_i} \alpha_i$$

In an example, $M_i$ may be the set of node i's neighbors. In this example, clusterhead selection algorithm 138 may be adapted to make a node i to be preferred as a clusterhead if node i has a larger degree than its neighbor nodes. In some examples, system 100 may be used in a centralized implementation, where one of the nodes acts as a centralized control node with information about network 118 such as topology data 136. In these examples, the maximum degree of a node in the network 118 may be used to identify nodes with the largest self-similarity.

In some examples, clusterhead selection algorithm 138 may be adapted to subtract a global constant from self-similarities to reduce the number of clusterheads and clusters selected. In these examples, the following formula may be used by clusterhead selection algorithm 138

$$s(i, i) = \alpha_i - \max_{i \in M_i} \alpha_i - \Delta$$

where $\Delta$ may be a parameter that controls the number of clusters determined. In an example, $\Delta$ may equal 10.

Among other benefits, system 100 may be effective to select a clusterhead based on a similarity of nodes and need not necessarily determine a cluster based on nodes that are geographically close to one another. As the clusterhead selection algorithm may be stored in one or more nodes in a network, less data overhead may be needed than if a centralized system were used. Nodes could be cognitive radios in a cognitive radio network and these nodes can coordinate local interactions and simplify network functions such as spectrum management and spectrum sensing.

An efficient number of clusters and clusterheads may be selected. In examples using the described system in a sensor network, sensor nodes can determine whether to participate in collaborative sensing even without knowledge of sensor correlations. Higher priority nodes may be protected in their use of communication frequencies compared with lower priority nodes. For example, a primary emitter of communication may not be known. In order to detect the presence or location of the primary emitter, a subset of nodes may be used to report on the presence or location of the primary emitter. The subset may be determined using, among other things, the clusterhead selection algorithm and system described herein.

Figure 2:
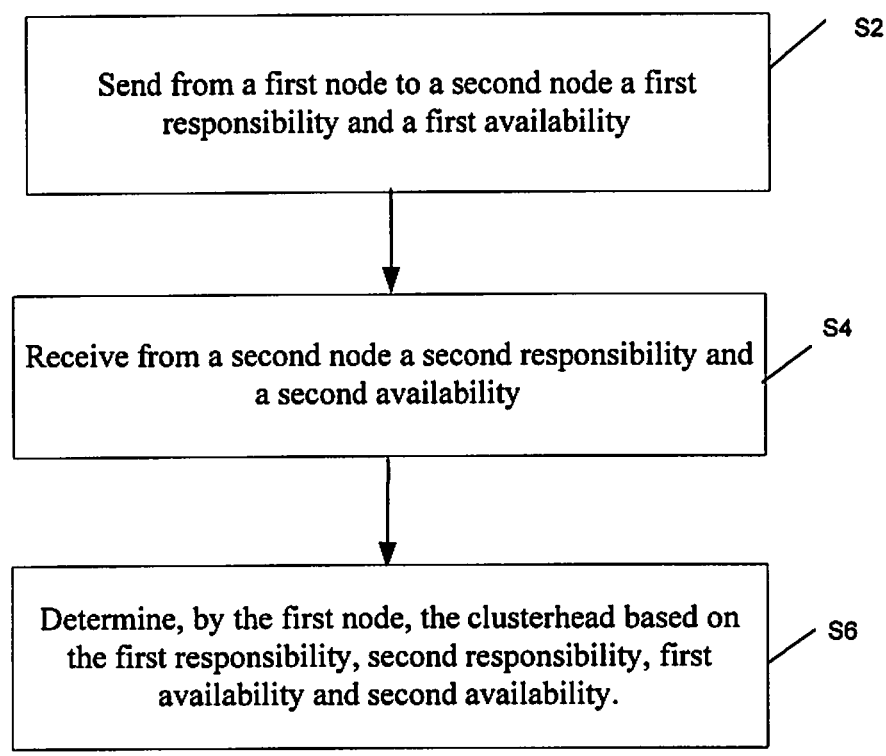
FIG. 2 depicts a flow diagram for example processes for implementing clusterhead selection in a communication network.

FIG. 2 depicts a flow diagram for example processes for clusterhead selection in a communication network in accordance with at least some embodiments described herein. The process in FIG. 2 could be implemented using, for example, system 100 discussed above. An example process may include one or more operations, actions, or functions as illustrated by one or more of blocks S2, S4 and/or S6. Although illustrated as discrete blocks, various blocks may be divided into additional blocks, combined into fewer blocks, or eliminated, depending on the desired implementation. Processing may begin at block S2.

At block S2, a processor may be configured to send from a first node to a second node a first responsibility and a first availability. In some examples, the first responsibility indicates a responsibility attributed to the second node to be the clusterhead for the first node. In some examples, the first availability indicates an availability of the first node to be the clusterhead for the second node. Processing may continue from block S2 to block 24.

At block S4, the processor may be configured to receive from a second node a second responsibility and a second availability. In some examples, the second responsibility indicates a responsibility attributed to the first node to be the clusterhead for the second node. In some examples, the second availability indicates an availability of the second node to be the clusterhead for the first node. Processing may continue from block S4 to block S6.

At block S6, the processor may be configured to determine the clusterhead based on the first responsibility, second responsibility, first availability and second availability.

FIG. 3 illustrates a computer program product 300 implementing clusterhead selection in a communication network according to at least some embodiments described herein. Computer program product 300 may include a signal bearing medium 302. Signal bearing medium 302 may include one or more instructions 304 that, when executed by, for example, a processor, may provide the functionality described above with respect to FIGS. 1-2. Thus, for example, referring to system 100, one or more of nodes 102, 104, 106, 108, 110, 112, 114 and/or 116 may undertake one or more of the blocks shown in FIG. 3 in response to instructions 304 conveyed to the system 100 by signal bearing medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, computer program product 300 may be conveyed to one or more modules of the system 100 by an RF signal bearing medium 302, where the signal bearing medium 302 is conveyed by a wireless communications medium 310 (e.g., a wireless communications medium conforming with an IEEE 802.11 standard).

Figure 4:
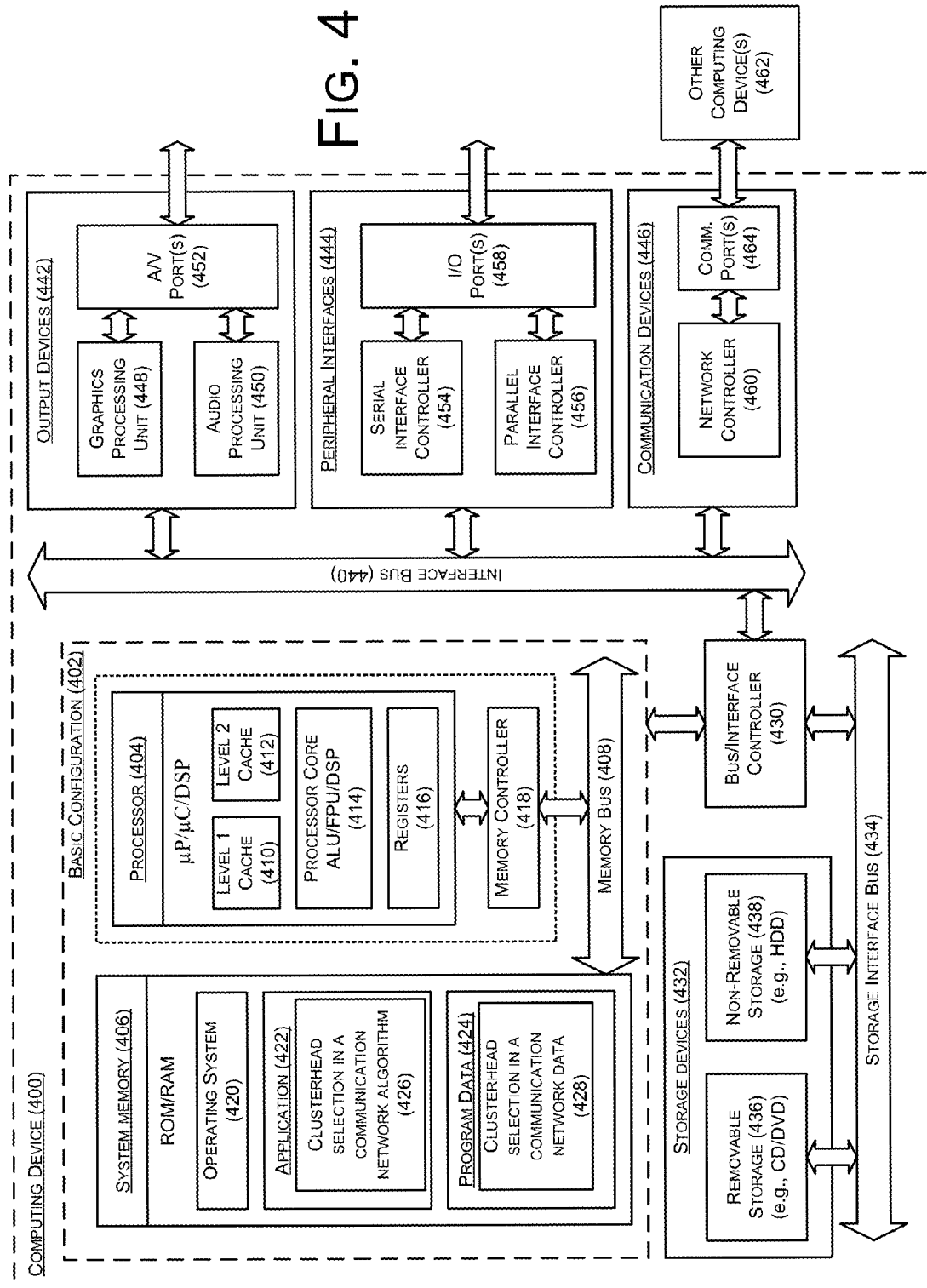
FIG. 4 is a block diagram illustrating an example computing device that is arranged to perform clusterhead selection in a communication network, all arranged according to at least some embodiments described herein.

FIG. 4 is a block diagram illustrating an example computing device 400 that is arranged to implement clusterhead selection in a communication network according to at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor ($\mu$P), a microcontroller ($\mu$C), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424.

Application 422 may include a clusterhead selection in a communication network algorithm 426 that is arranged to perform the functions as described herein including those described previously with respect to FIGS. 1-3. Program data 424 may include clusterhead selection in a communication network data 428 that may be useful for implementing clusterhead selection in a communication network as is described herein. In some embodiments, application 422 may be arranged to operate with program data 424 on operating system 420 such that clusterhead selection in a communication network may be provided. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology. CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication medium. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for selecting a clusterhead in a network comprising a plurality of nodes, the method comprising:
    sending from a first node a first responsibility and a first availability to a second node, wherein the first responsibility indicates a responsibility attributed to the second node to be the clusterhead for the first node, wherein the first responsibility is based on a similarity between the first node and the second node, and wherein the first availability indicates an availability of the first node to be the clusterhead for the second node and the similarity between the first node and the second node is based on shared communication frequencies or a strength of a communication link between the first node and the second node;
    sending from the first node a second responsibility and a second availability to a third node, wherein the second responsibility indicates a responsibility attributed to the third node to be the clusterhead for the first node, wherein the second responsibility is based on a similarity between the third node and the first node, the similarity between the first node and the third node is based on shared communication frequencies between the first and third nodes, or a strength of a communication link between the first node and the third node, and the second availability indicates an availability of the first node to be the clusterhead for the third node;
    receiving from the second node a third responsibility and a third availability at the first node, wherein the third responsibility indicates a responsibility attributed to the first node to be the clusterhead for the second node, wherein the third responsibility is based on the similarity between the second node and the first node, and wherein the third availability indicates an availability of the second node to be the clusterhead for the first node;
    receiving from the third node a fourth responsibility and a fourth availability at the first node, wherein the fourth responsibility indicates a responsibility attributed to the first node to be the clusterhead for the third node, wherein the fourth responsibility is based on the similarity between the first node and the third node, wherein the fourth availability indicates an availability of the third node to be the clusterhead for the first node;
    determining, by the first node, that the second node is a first clusterhead for the first node based on the first responsibility, third responsibility, first availability and third availability, wherein the first clusterhead is configured to communicate on behalf of the first node; and
    receiving a message from the third node at the first node, wherein the message is effective to indicate a selection of the first node to be a second clusterhead for the third node, and the selection of the first node to be the second clusterhead is based on the second responsibility, fourth responsibility, second availability and fourth availability, wherein the second clusterhead is configured to communicate on behalf of the third node.

2. The method as recited in claim 1, wherein the first responsibility is based on the first availability.

3. The method as recited in claim 1, further comprising:
    sending the third responsibility and the third availability from the second node; and
    repeating, sending from the first node the first responsibility and first availability and sending the third responsibility and the third availability from the second node.

4. The method as recited in claim 3, further comprising adding a damping factor to the first responsibility, the second responsibility, the first availability, the second availability, the third responsibility, the third availability, the fourth responsibility, and the fourth availability.

5. The method as recited in claim 1, further comprising:
    determining a self-similarity value for the first node; and
    determining the first clusterhead for the first node based on the self-similarity value.

6. The method as recited in claim 1, wherein determining that the second node is the first clusterhead for the first node includes:
    determining, by the first node, that the second node is the first clusterhead for the first node based on a number of neighbors to the second node.

7. The method as recited in claim 1, further comprising:
    determining, by the first node, that the first node is the first clusterhead for the first node when no other neighbor to the first node is the clusterhead.

8. The method as recited in claim 1, wherein the first and second nodes are one communication hop from each other.

9. The method as recited in claim 1, further comprising:
    determining, by the first node, that the first node is the first clusterhead for the first node when a fifth responsibility plus a fifth availability is greater than a threshold;
    wherein the fifth responsibility indicates a responsibility attributed to the first node to be the first clusterhead for the first node; and
    the fifth availability indicates an availability of the first node to be the first clusterhead for the first node.

10. The method of claim 1 further comprising, prior to determining the first clusterhead for the first node:
    updating, by the first node, the similarity between the first and second nodes based on the third responsibility and the third availability received from the second node;
    updating, by the first node, the first responsibility based on the updated similarity;
    detecting a convergence associated with the first responsibility, the third responsibility, the first availability, and the third availability, wherein determining that the second node is the first clusterhead for the first node is performed in response to the detection of the convergence.

11. A first node effective to select a clusterhead in a network comprising a plurality of nodes, the first node comprising:
    a memory;
    a processor in communication with the memory,
    wherein the processor is effective to:
        send a first responsibility and a first availability to a second node, wherein the first responsibility indicates a responsibility attributed to the second node to be the clusterhead for the first node, wherein the first responsibility is based on a similarity between the first node and the second node, wherein the first availability indicates an availability of the first node to be the clusterhead for the second node and the similarity between the first node and the second node is based on shared communication frequencies or a strength of a communication link between the first node and the second node;
        send a second responsibility and a second availability to a third node, wherein the second responsibility indicates a responsibility attributed to the third node to be the clusterhead for the first node, wherein the second responsibility is based on a similarity between the third node and the first node, the similarity between the first node and the third node is based on shared communication frequencies between the first and third nodes, or a strength of a communication link between the first node and the third node, and the second availability indicates an availability of the first node to be the clusterhead for the third node;

receive from the second node a third responsibility and a third availability at the first node, wherein the third responsibility indicates a responsibility attributed to the first node to be the clusterhead for the second node, wherein the third responsibility is based on the similarity between the second node and the first node, and wherein the third availability indicates an availability of the second node to be the clusterhead for the first node;

receive from the third node a fourth responsibility and a fourth availability, wherein the fourth responsibility indicates a responsibility attributed to the first node to be the clusterhead for the third node, wherein the fourth responsibility is based on the similarity between the first node and the third node, wherein the fourth availability indicates an availability of the third node to be the clusterhead for the first node;

determine that the second node is a first clusterhead for the first node based on the first responsibility, third responsibility, first availability and third availability, wherein the first clusterhead is configured to communicate on behalf of the first node;

receive a message from the third node, wherein the message is effective to indicate a selection of the first node to be a second clusterhead for the third node, and the selection of the first node to be the second clusterhead is based on the second responsibility, fourth responsibility, second availability and fourth availability, wherein the second clusterhead is configured to communicate on behalf of the third node;

store an indication of the first clusterhead in the memory.

12. The first node as recited in claim 11, wherein the processor is further effective to:
determine a self-similarity value for the first node;
determine the first clusterhead for the first node based on the self-similarity value.

13. The first node as recited in claim 11, wherein the processor is effective to determine that the first node is the first clusterhead for the first node when no other neighbor to the first node is the first clusterhead.

14. The first node as recited in claim 11, wherein the processor is further effective to:
determine that the first node is the first clusterhead for the first node when a fifth responsibility plus a fifth availability is greater than a threshold;
wherein the fifth responsibility indicates a responsibility attributed to the first node to be the first clusterhead for the first node; and
the fifth availability indicates an availability of the first node to be the first clusterhead for the first node.

15. The first node of claim 11, wherein the processor is further effective to:
update the similarity between the first and second nodes based on the third responsibility and the third availability received from the second node;
update the first responsibility based on the updated similarity;

detect a convergence associated with the first responsibility, the third responsibility, the first availability, and the third availability, wherein the determination that the second node is the first clusterhead for the first node is performed in response to the detection of the convergence.

16. A system effective to select a clusterhead in a network comprising a plurality of nodes, the system comprising:
a first node including a first memory and a first processor;
a second node in communication with the first node, the second node including a second memory and a second processor;
a third node in communication with the first node and the second node, the third node including a third memory and a third processor;
wherein the first processor is effective to:
send a first responsibility and a first availability to the second node, wherein the first responsibility indicates a responsibility attributed to the second node to be the clusterhead for the first node, wherein the first responsibility is based on a similarity between the first node and the second node, and wherein the second availability indicates an availability of the first node to be the clusterhead for the second node and the similarity between the first node and the second node is based on shared communication frequencies between the first and second nodes, shared communication frequencies or a strength of a communication link between the first node and the second node;
send a second responsibility and a second availability to the third node, wherein the second responsibility indicates a responsibility attributed to the third node to be the clusterhead for the first node, wherein the second responsibility is based on a similarity between the third node and the first node, the similarity between the first node and the third node is based on shared communication frequencies between the first and third nodes, or a strength of a communication link between the first node and the third node, and the second availability indicates an availability of the first node to be the clusterhead for the third node;
wherein the second processor is effective to:
receive the first responsibility and the first availability from the first processor; and
send a third responsibility and a third availability to the first node, wherein the third responsibility indicates a responsibility attributed to the first node to be the clusterhead for the second node, wherein the third responsibility is based on the similarity between the second node and the first node, and wherein the third availability indicates an availability of the second node to be the clusterhead for the first node;
wherein the third processor is effective to:
send a fourth responsibility and a fourth availability to the first node, wherein the fourth responsibility indicates a responsibility attributed to the first node to be the clusterhead for the third node, wherein the fourth responsibility is based on the similarity between the first node and the third node, and wherein the fourth availability indicates an availability of the third node to be the clusterhead for the first node;
wherein the first processor is further effective to:
receive the third responsibility and the third availability from the second processor;
determine that the second node is a first clusterhead for the first node based on the first responsibility, third responsibility, first availability and third availability, wherein the first clusterhead is configured to communicate on behalf of the first node; and
store an indication of the first clusterhead in the first memory;
wherein the third processor is further effective to:
receive the second responsibility and the second availability from the first processor;
determine that the first node is a second clusterhead for the third node based on the second responsibility, fourth responsibility, second availability and fourth availability, wherein the second clusterhead is configured to communicate on behalf of the third node; and
send a message to the first node, wherein the message is effective to indicate a selection of the first node to be a second clusterhead for the third node.

17. The system as recited in claim 16, wherein the first processor is effective to, after the second processor receives the first responsibility and the first availability:
send a fifth responsibility and a fifth availability to the second node, wherein the fifth responsibility indicates a responsibility attributed to the second node to be the clusterhead for the first node, wherein the fourth availability indicates an availability of the first node to be the clusterhead for the second node;
wherein the second processor is effective to, after the first processor receives the third responsibility and the third availability:
receive the fifth responsibility and the fifth availability; and
send a sixth responsibility and a sixth availability to the first node,
wherein the sixth responsibility indicates a responsibility attributed to the first node to be the clusterhead for the second node, wherein the sixth availability indicates an availability of the second node to be the clusterhead for the first node;
wherein the first processor is effective to:
receive the sixth responsibility and the sixth availability; and
determine the first clusterhead for the first node based on the fifth responsibility, the fifth availability, the sixth responsibility and the sixth availability.

18. The system of claim 16, wherein the first processor of the first node is further effective to:
update the similarity between the first and second nodes based on the third responsibility and the third availability received from the second node;
update the first responsibility based on the updated similarity;
detect a convergence associated with the first responsibility, the third responsibility, the first availability, and the third availability, wherein the determination that the second node is the first clusterhead for the first node is performed in response to the detection of the convergence.

* * * * *